United States Patent
Huang (10) Patent No.: US 8,540,232 B2
(45) Date of Patent: Sep. 24, 2013

(54) STOPPER, PAPER FEEDING DEVICE AND MULTI-FUNCTION PRINTER

(75) Inventor: Chung-Liang Huang, New Taipei (TW)

(73) Assignees: Cal-Comp Electronics & Communications Company Limited, New Taipei (TW); Kinpo Electronics, Inc., New Taipei (TW)

( * ) Notice: Subject to any disclaimer, the term of this patent is extended or adjusted under 35 U.S.C. 154(b) by 0 days.

(21) Appl. No.: 13/530,078

(22) Filed: Jun. 21, 2012

(65) Prior Publication Data

US 2013/0134650 A1 May 30, 2013

(30) Foreign Application Priority Data

Nov. 25, 2011 (TW) .............................. 100143346 A (51) Int. Cl.
*B65H 3/52* (2006.01)
(52) U.S. Cl.
USPC ............................ 271/124; 271/121; 271/167
(58) Field of Classification Search
USPC .......................... 271/121, 124, 167, 243, 244
See application file for complete search history.

(56) References Cited

U.S. PATENT DOCUMENTS

| 8,322,708 | B2* | 12/2012 | Liu | 271/124 |
| 2003/0160385 | A1* | 8/2003 | Furusawa | 271/220 |
| 2004/0188918 | A1* | 9/2004 | Morimoto et al. | 271/121 |
| 2010/0244368 | A1* | 9/2010 | Lin | 271/121 |

FOREIGN PATENT DOCUMENTS

| TW | M290160 | 5/2006 |
| TW | 201024096 | 7/2010 |

* cited by examiner

*Primary Examiner* — Prasad Gokhale
(74) *Attorney, Agent, or Firm* — Jianq Chyun IP Office (57) ABSTRACT

A stopper, a paper feeding device including an inner and outer cases, a first and second axels, a first and second rollers, a pair of stoppers and a tray, and a multi-function printer are provided. The outer case has two side walls and two protrusions disposed on the side walls. The inner case is between the two side walls. The first axel pivots the inner case and the side walls. The first roller covers the first axel. The stoppers are disposed at outer side of the side walls, wherein each of the stoppers has a C-ring, a connecting portion and a stopping portion. Each C-ring pivoted to the first axel has a first and second ends, and the protrusions prop against to the first ends. The second axel pivots the inner case, and the second roller covers the second axel. The tray is disposed below the first roller.

33 Claims, 13 Drawing Sheets

STOPPER, PAPER FEEDING DEVICE AND MULTI-FUNCTION PRINTER

CROSS-REFERENCE TO RELATED APPLICATION

This application claims the priority benefit of Taiwan application serial no. 100143346, filed on Nov. 25, 2011. The entirety of the above-mentioned patent application is hereby incorporated by reference herein and made a part of this specification.

BACKGROUND OF THE INVENTION

1. Field of the Invention

The present invention is related to a stopper, a paper feeding device and a multi-function printer, and particularly to a stopper, a paper feeding device and a multi-function printer using the stopper, wherein the stopper has different structure than the conventional stopper.

2. Description of Related Art

As the information society arrives, office automatic equipments such as scanners, photocopiers or printers are disposed in offices, and users may perform secretarial processing operations using these office automatic equipments. It should be noted that when the above plurality of office automatic equipment is simultaneously disposed in the office, a lot of space is consumed. As a result, a multi-function printer (MFP) integrated with functions of copying, printing, scanning and the like is developed to resolve the above problem.

A user often puts a stack of paper in the MFP for copying, printing, and scanning. The multi-function printer needs stoppers to effectively stop the papers to be fed into the multi-function printer in order to prevent many papers is transmitted into the MFP at the same time and affect the printing process or affect the printing quality.

Figure 1:
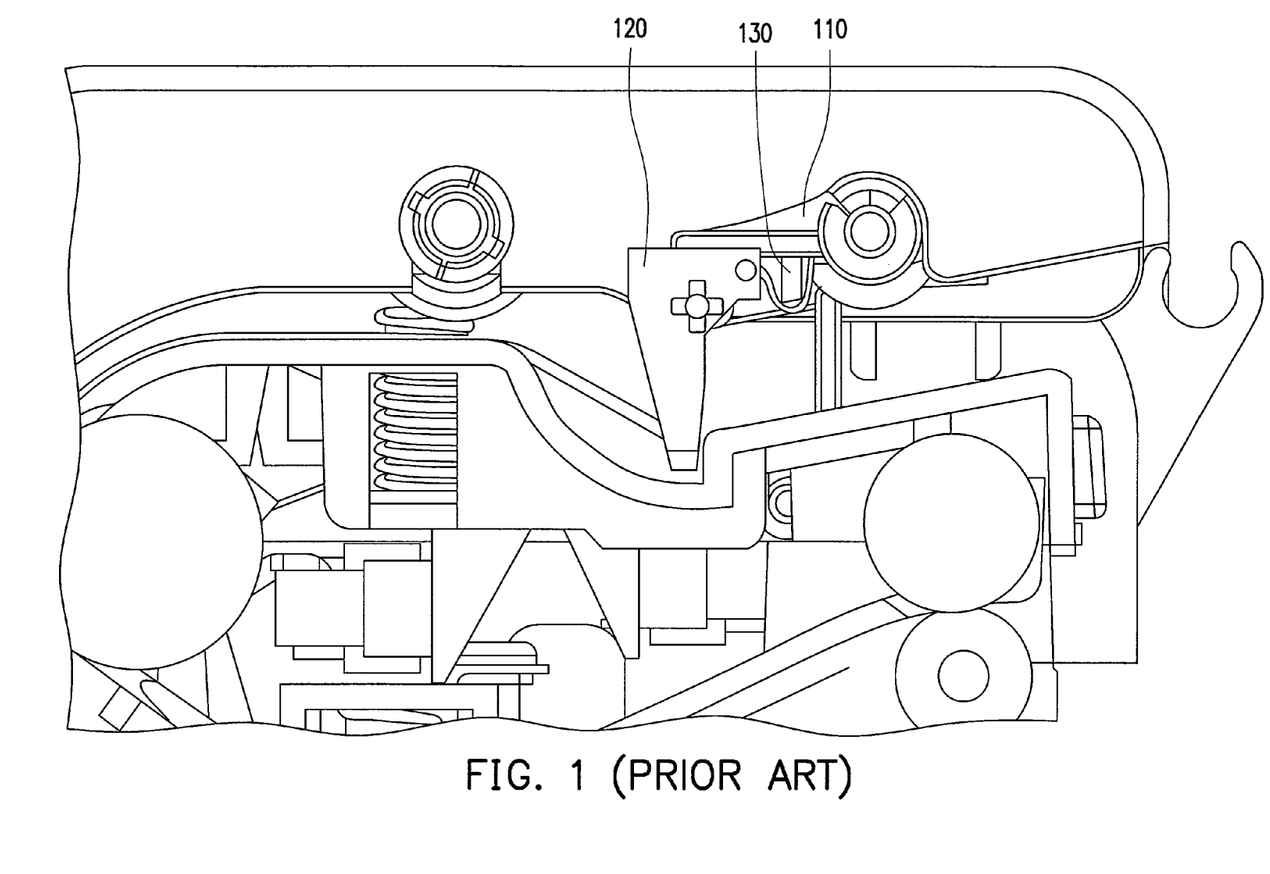
FIG. 1 illustrates a schematic view of a conventional multi-function printer.

FIG. 1 illustrates a schematic view of a conventional multi-function printer. Please refer to FIG. 1, the paper feeding device of the conventional MFP includes a first stopper 110, a second stopper 120 and a protrusion 130 disposed in the inner case to drive the first stopper 110. In the status of the paper not being taken, the first stopper 110 may contact the second stopper 120 so as to restrict the second stopper 120, and the second stopper 120 prevents the paper to be fed. When the paper is taken, the descending of the inner case may let the protrusion 130 disposed on the inner case to push the first stopper 110, so that the first stopper 110 rotates in a clockwise and releases the restriction of the second stopper 120 and so that the second stopper 120 rotates freely. In this time, the rotation of the roller may let the paper to freely pass through the second stopper 120 and enter the paper transmitting channel.

However, after the user opens the outer case of the MFP and repairs the components within the MFP and closes the outer case, the first stopper 110 or the second stopper 120 may fail to return to their original positions, and it may lead to the invalid of the functions of the first stopper 110 or the second stopper 120.

Furthermore, in such configuration, two stoppers are needed and thus material costs may relatively be increased.

SUMMARY OF THE INVENTION

The present invention provides a stopper having a different structure than the conventional stopper.

The present invention provides a paper feeding device capable of no paper interfering during paper feeding process.

The present invention provides a multi-function printer having a good printing quality.

The present invention provides a stopper, adapted to a paper feeding device, having a C-ring, a connecting portion and a stopping portion, wherein the C-ring is disposed around and covers an axel of the paper feeding device. The C-ring has a first end and a second end. The second end extends along a tangent direction and is connected to a third end of the connecting portion. The stopping portion is connected to a fourth end of the connecting portion. And an included angle is formed between the stopping portion and the connecting portion.

The present invention further provides a paper feeding device including an outer case, and inner case, a first axel, a first roller, a pair of stoppers, a second axel, a second roller and a tray. The outer case has a pair of side walls and a pair of limiting protrusions, wherein each limiting protrusion is correspondingly disposed at one of the pair of side walls. The inner case is located between the pair of side walls of the outer case, and each side wall is located between the inner case and the corresponding limiting protrusion. The first axel pivots the inner case and the side wall, wherein the first roller is disposed around and covers the first axel and located in the inner case. The pair of stoppers are disposed at outer sides of the pair of side walls which are relatively distant from the inner case, wherein each stopper has a C-ring, a connecting portion and a stopping portion. The C-ring is disposed around and covers the first axel. The C-ring has a first end and a second end. The limiting protrusion props against the first end. The second end extends along a tangent direction and is connected to a third end of the connecting portion. The stopping portion is connected to a fourth end of the connecting portion. And an included angle is formed between the stopping portion and the connecting portion. The second axel is pivoted at the inner case, and located at a side of the inner case opposite to the first axel. And the second roller is disposed around and covers the second axel and located in the inner case. The tray is disposed below the first roller and located in the inner case.

The present invention further provides a multi-function printer including a body and a paper feeding device disposed at the body. The paper feeding device includes an outer case, and inner case, a first axel, a first roller, a pair of stoppers, a second axel, a second roller and a tray. The outer case has a pair of side walls and a pair of limiting protrusions, wherein each limiting protrusion is correspondingly disposed at one of the pair of side walls. The inner case is located between the pair of side walls of the outer case, and each side wall is located between the inner case and the corresponding limiting protrusion. The first axel pivots the inner case and the side walls, and the first roller is disposed around and covers the first axel and located in the inner case. The pair of stoppers are disposed at outer sides of the pair of side walls which are relatively distant from the inner case, wherein each stopper has a C-ring, a connecting portion and a stopping portion. The C-ring is disposed around and covers the first axel. The C-ring has a first end and a second end. The limiting protrusion props against the first end. The second end extends along a tangent direction and is connected to a third end of the connecting portion. The stopping portion is connected to a fourth end of the connecting portion. And an included angle is formed between the stopping portion and the connecting portion. The second axel is pivoted at the inner case, and located at a side of the inner case opposite to the first axel. And the second roller is disposed around and covers the second axel and located in the inner case. The tray is disposed below the first roller and located in the inner case.

According to an exemplary embodiment of the present invention, a material of the stoppers is plastic.

According to an exemplary embodiment of the present invention, the included angle formed between the stopper and the connecting portion is an acute angle, a right angle or an obtuse angle.

According to an exemplary embodiment of the present invention, the first end of each stopper further has a first guiding surface, and each limiting protrusion further has a second guiding surface, and the first guiding surface and the second guiding surface prop against each other.

According to an exemplary embodiment of the present invention, the second end of each stopper further has a protrusion protruding toward the first end.

According to an exemplary embodiment of the present invention, each stopper further has a limiting portion connected to the first end of the C-ring and extending along a radial direction of the C-ring.

According to an exemplary embodiment of the present invention, a side of the inner case pivoted with the first axel moves along a clockwise direction toward the tray by taking the second axel as a rotating center, the first end of each stopper is propped against by the corresponding limiting protrusion, the stoppers rotates along a clockwise direction from a stopping position to a paper feeding position by taking the first axel as a rotating center. Additionally, each limiting protrusion has a side surface, and the limiting portions of the stoppers correspondingly prop against the side surfaces, and the stoppers are restricted by the limiting protrusions and fixed at the paper feeding position. In addition, a side of the inner case pivoted with the first axel moves along a counter clockwise direction to return to an original position by taking the second axel as a rotating center, the first end of each stopper and the corresponding limiting protrusion release the restriction, the stoppers rotates along a counter clockwise direction from the paper feeding position to the stopping position by taking the first axel as a rotating center. Via dead weights of the stoppers, the stoppers rotate along with the first axel, and the limiting portions taking the first axel as a rotating center rotate along profiles of the corresponding limiting protrusions in a counter clockwise direction from the paper feeding position to the stopping position.

According to an exemplary embodiment of the present invention, a side of the inner case pivoted with the first axel moves along a clockwise direction toward the tray by taking the second axel as a rotating center, the first end of each stopper is propped against by the corresponding limiting protrusion, the stoppers rotates along a clockwise direction from a stopping position to a paper feeding position by taking the first axel as a rotating center. Additionally, each limiting protrusion has a side surface, and the first ends of the C-rings of the stoppers correspondingly prop against the side surfaces, and the stoppers are restricted by the limiting protrusions and fixed at the paper feeding position. Furthermore, a side of the inner case pivoted with the first axel moves along a counter clockwise direction to return to an original position by taking the second axel as a rotating center, the first end of each stopper and the corresponding limiting protrusion release the restriction, the stoppers rotates along a counter clockwise direction from the paper feeding position to the stopping position by taking the first axel as a rotating center. Via dead weights of the stoppers, the stoppers rotate along with the first axel, and the limiting portions taking the first axel as a rotating center rotate along profiles of the corresponding limiting protrusions in a counter clockwise direction from the paper feeding position to the stopping position.

In light of the above, the stopper of the present invention is different in structure than the conventional stopper, and thus less components can be used and the fabricating costs of the paper feeding device can further be reduced by using the stopper of the invention. Furthermore, by application of the paper feeding device having the stopper of the invention in the multi-function printers, the papers can be effectively stopped and the papers are not interfered during the paper feeding process, and thus the paper can be maintained as original and the printing quality can further be increased.

In order to make the aforementioned and other features and advantages of the invention more comprehensible, embodiments accompanying figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

FIG. 5C and FIG. 5D are schematic views respectively illustrating the multi-function printer depicted in FIG. 5A and FIG. 5B is in the status of paper feeding.

DESCRIPTION OF EMBODIMENTS

First Embodiment

Figure 2:
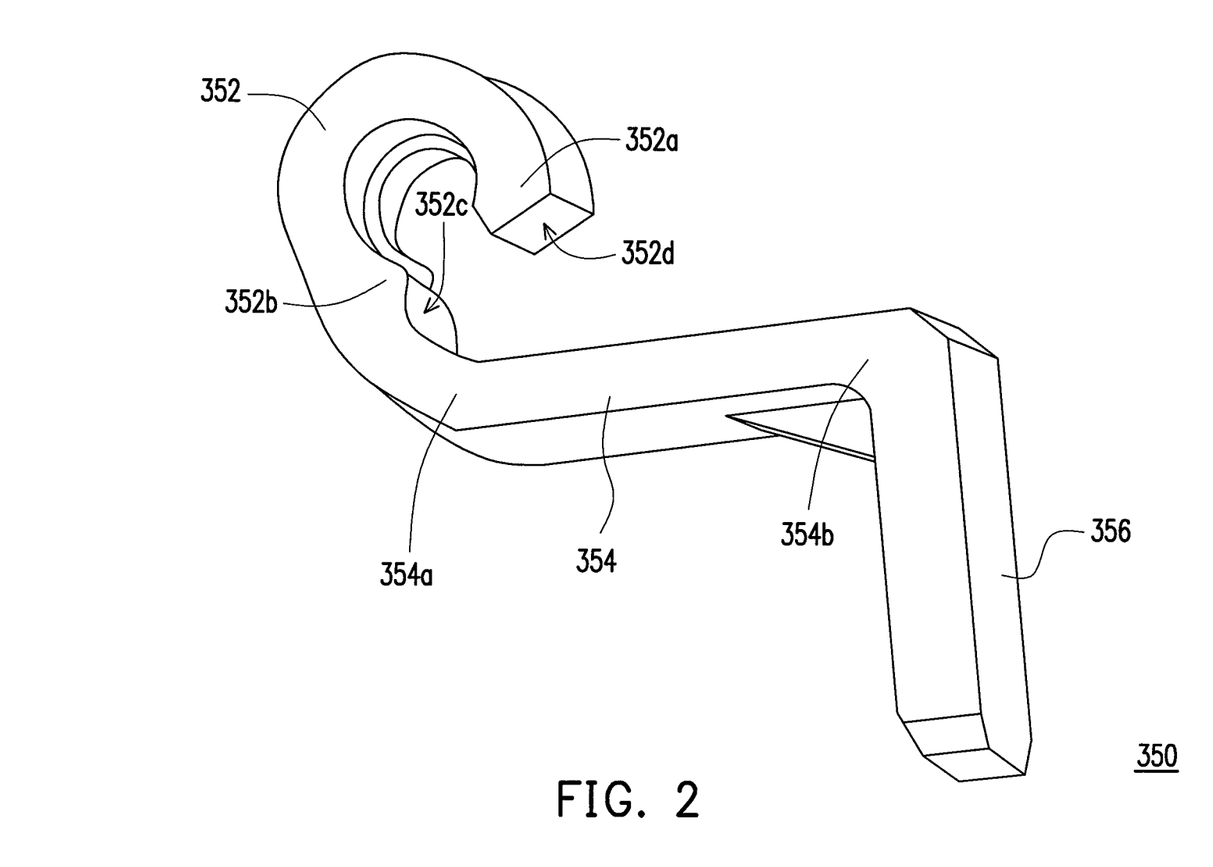
FIG. 2 is a schematic view of a stopper according to an embodiment of the present invention.
Figure 3:
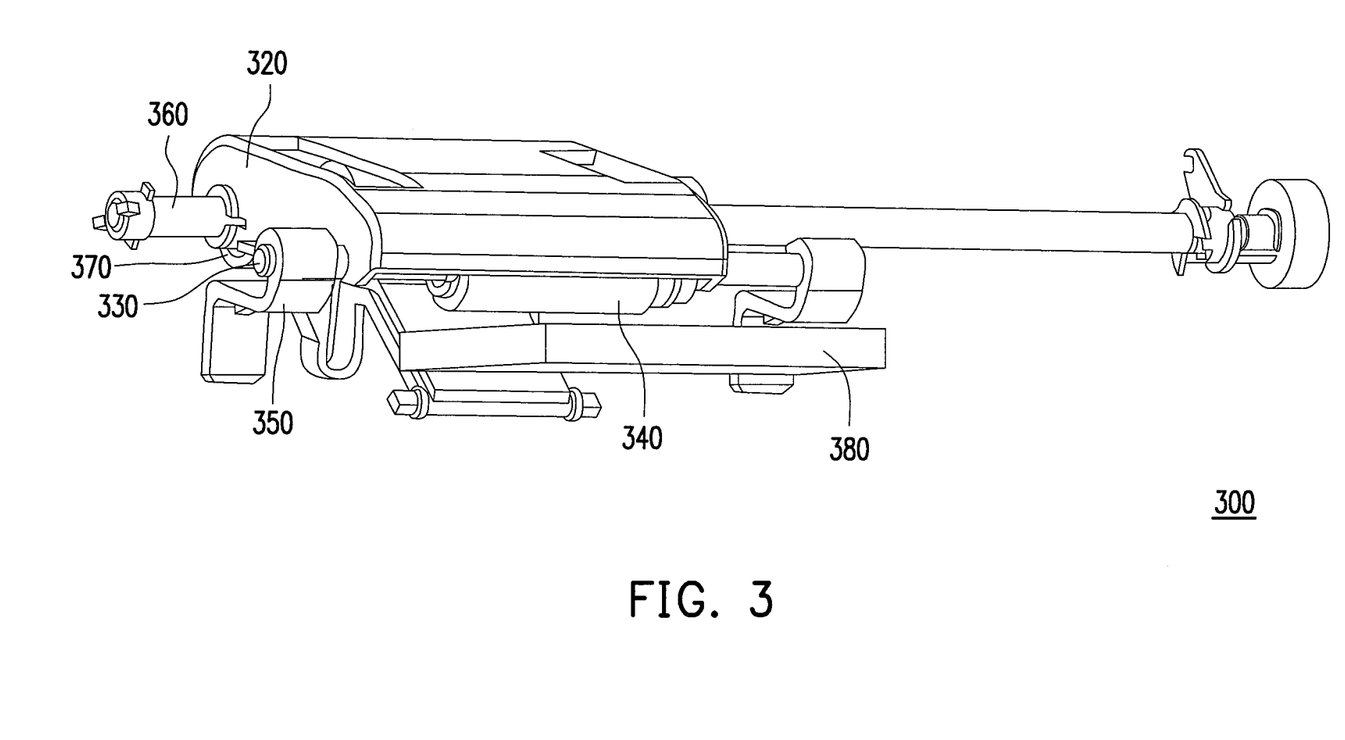
FIG. 3 is a schematic view of a paper feeding device applying the stopper according to an embodiment of the present invention.

FIG. 2 is a schematic view of a stopper according to an embodiment of the present invention. FIG. 3 is a schematic view of a paper feeding device applying the stopper according to an embodiment of the present invention. Please refer to FIG. 2 and FIG. 3 together, the paper feeding device 300 includes an outer case 310 (shown in FIG. 5A), and inner case 320, a first axel 330, a first roller 340, a pair of stoppers 350, a second axel 360, a second roller 370 and a tray 380. The outer case 310 has a pair of side walls 312 and a pair of limiting protrusions 314, wherein each limiting protrusion 314 is correspondingly disposed at one of the side walls 312. The inner case 320 is located between the pair of side walls 312 of the outer case 310, and each side wall 312 is located between the inner case 320 and the corresponding limiting protrusion 314. The first axel 330 is pivoted to the inner case 320 and the side walls 312 and the two ends of the first axel 330 protrude to the outside of the side walls 312. The first roller 340 is disposed around and covers the first axel 330 and located in the inner case 320.

The stopper 350 is disposed at an outer side of the side wall 312 which is relatively distant from the inner case 320, wherein each stopper 350 has a C-ring 352, a connecting portion 354 and a stopping portion 356. The C-ring 352 is disposed around and covers the end of the first axel 330, and thus the C-ring 352 can rotate by taking the first axel 330 as a rotating center. Herein the C-ring 352 has a first end 352a and a second end 352b. The limiting protrusion 314 disposed on the side wall 312 of the outer case 310 is propped to the first end 352a. The rotating angle of the C-ring 352 can be determined by the relative position of the C-ring 352 to the limiting protrusion 314. In addition, the second end 352b of the C-ring 352 substantially extends along the tangent direction and is connected to a third end 354a of the connecting portion 354. And the stopping portion 356 is connected to a fourth end 354b of the connecting portion 354, and an included right angle is formed between the stopping portion 356 and the connecting portion 354 in the present embodiment.

As described above, the second axel 360 is pivoted to the inner case 320 and the side walls 312, and the second axel 360 and the first axel 330 are located at the opposite sides of the inner case 320. And the second roller 370 is disposed around and covers the second axel 360 and located in the inner case 320. The tray 380 is disposed below the first roller 340 and located in the inner case 320.

Figure 4A:
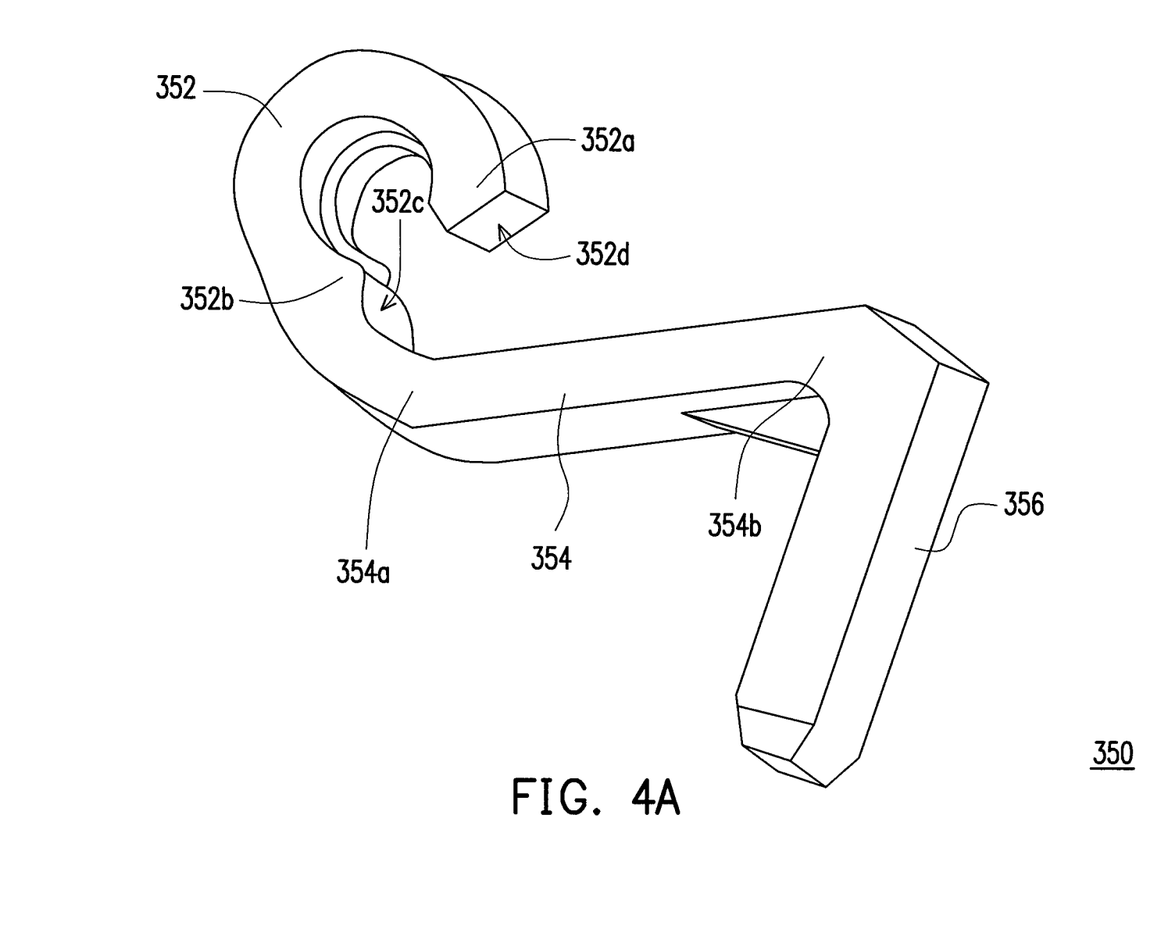
FIG. 4A and FIG. 4B are other probable schematic operational views of the stopper of FIG. 2.
Figure 4B:
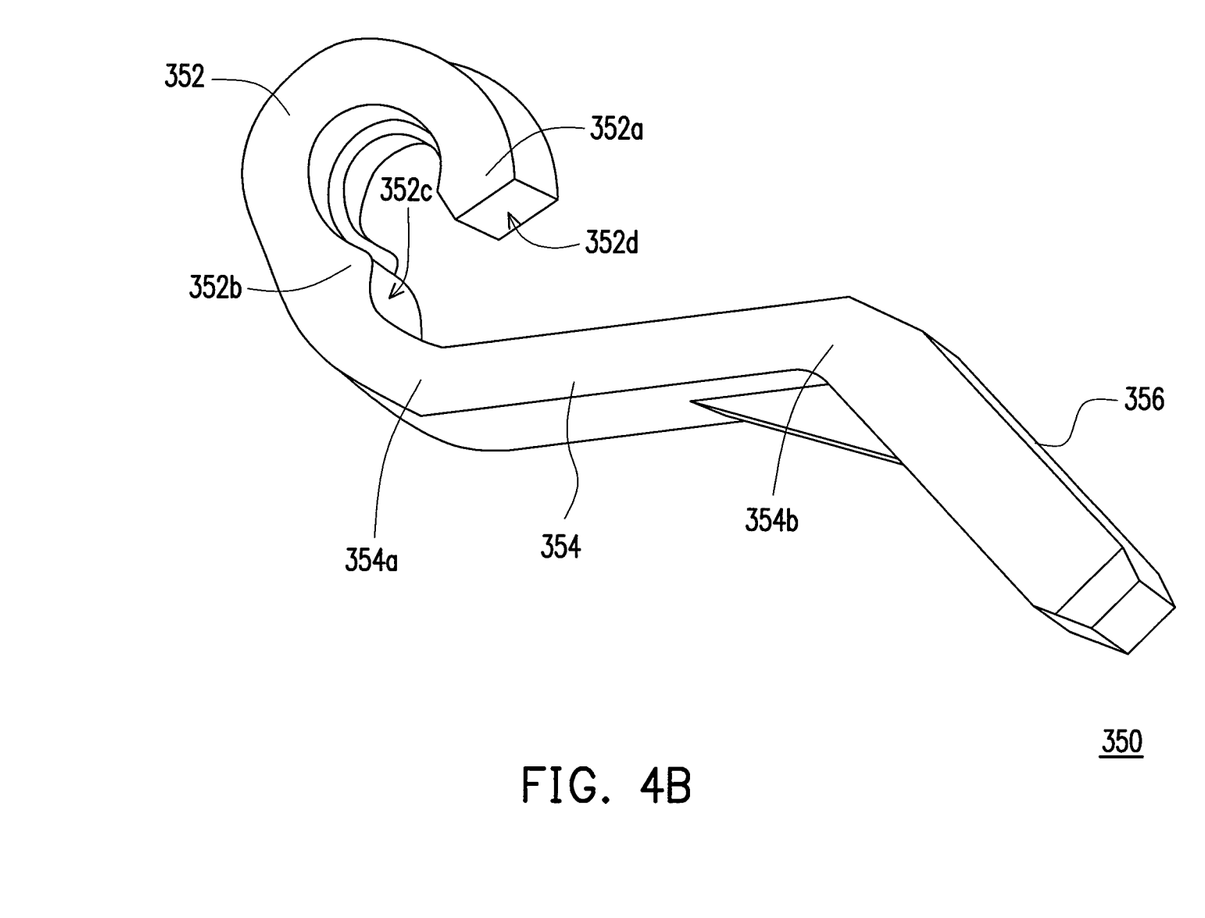

In the present embodiment, the material of the stopper 350 is plastic. And the included right angle between the stopping portion 356 of the stopper 350 and the connecting portion 354 can be altered according to actual requirements, under the condition of the stopper 350 being capable to stop the papers. For instance, the included angle between the stopping portion 356 and the connecting portion 354 can be an acute angle (as shown in FIG. 4A) or an obtuse angle (as shown in FIG. 4B).

The second end 352b of the stopper 350 can further have a protrusion 352c protruding toward the first end 352a, wherein the configuration of the protrusion 352c ensures that the C-ring 352 surrounds most of the first axel 330 and further prevents the stopper 350 escaping from the first axel 330.

Figure 5A:
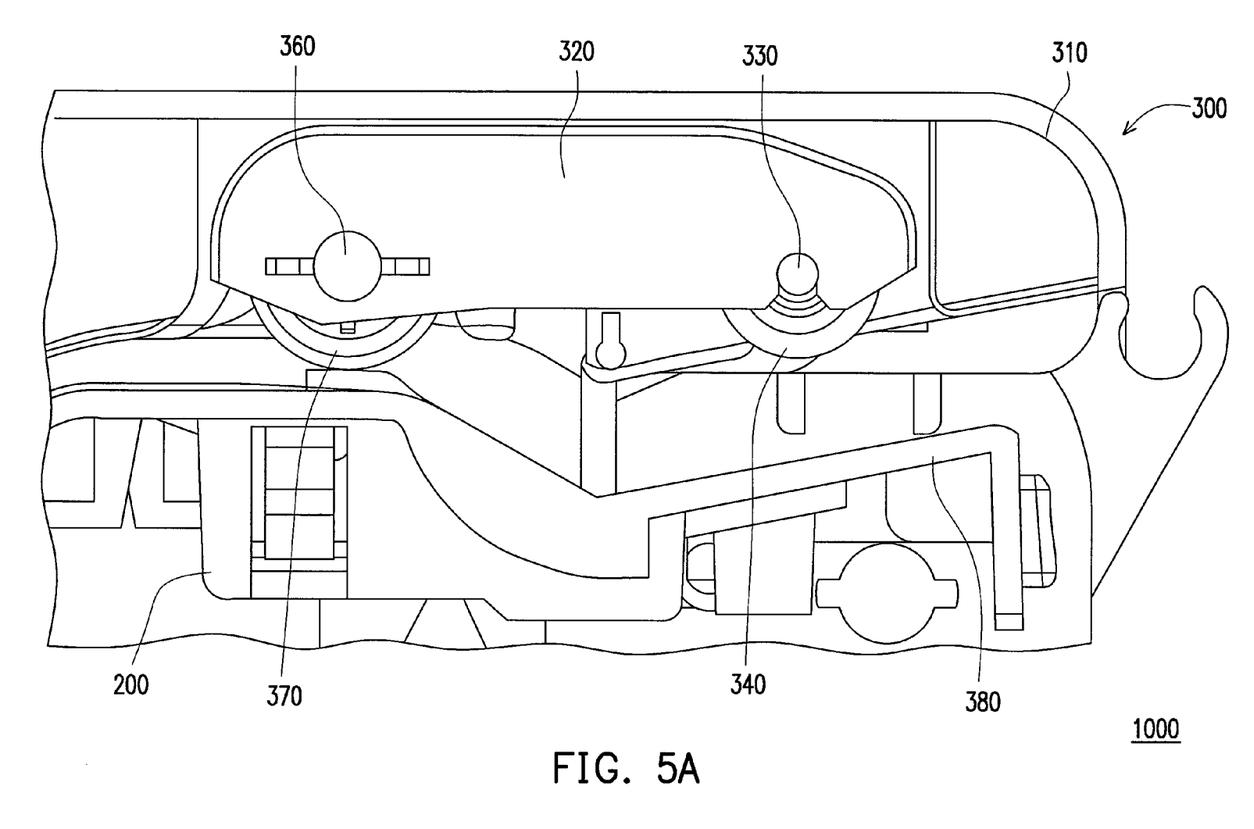
FIG. 5A and FIG. 5B are schematic views of a multi-function printer using the paper feeding device of FIG. 3.
Figure 5B:
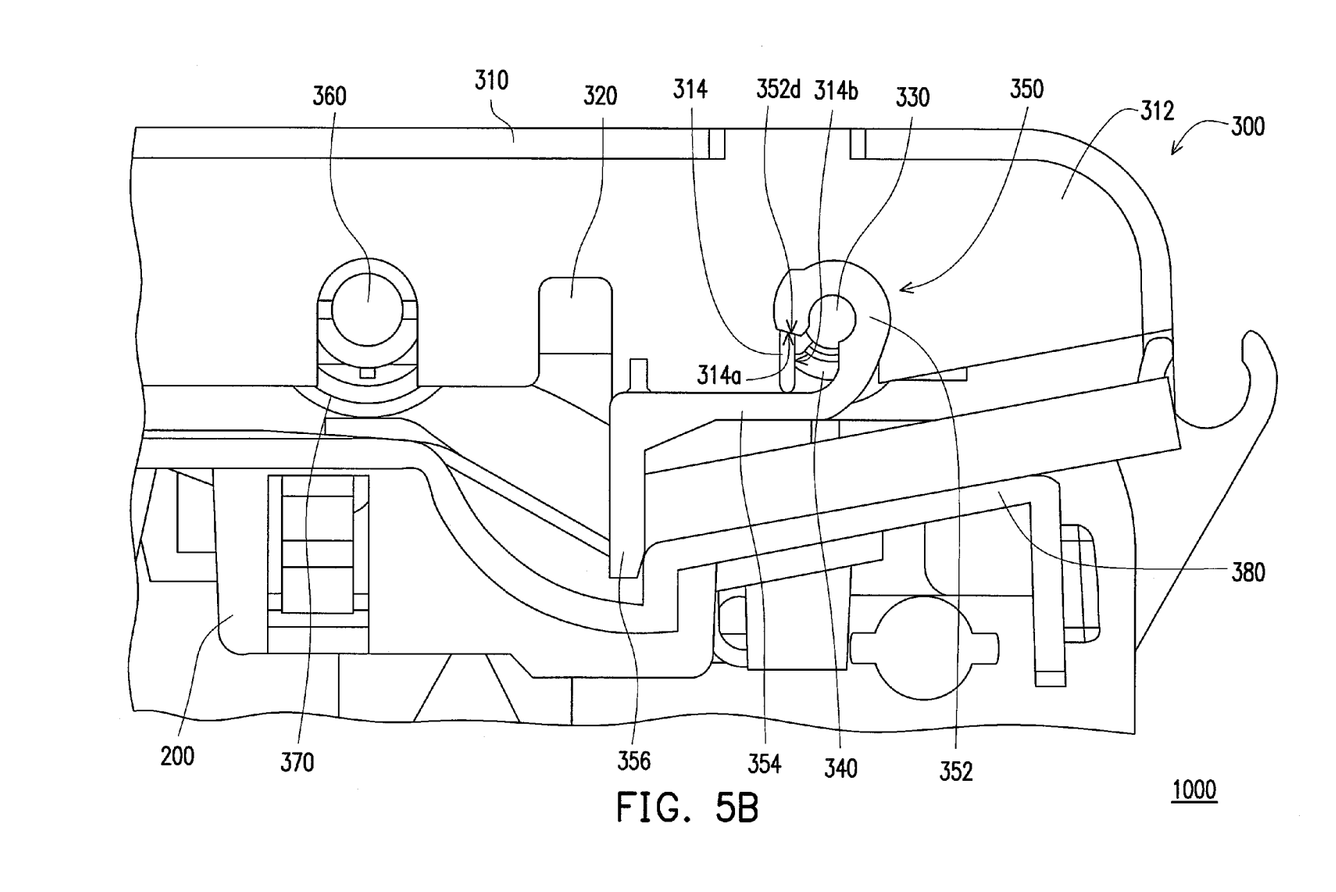

FIG. 5A and FIG. 5B are schematic views of a multi-function printer using the paper feeding device of FIG. 3, wherein the multi-function printer is in the status of not feeding paper. FIG. 5A and FIG. 5B are in the same viewing angle but different cross-sectional schematic views, wherein FIG. 5A illustrates the inner case 320 but does not illustrate the stopper 350, and FIG. 5B illustrates the stopper 350 and the limiting protrusion 314 which is used for restricting the stopper 350. Please refer to FIG. 3, FIG. 5A and FIG. 5B together, the paper feeding device 300 is disposed on the body 200 to assemble and obtain a multi-function printer 1000.

Figure 5C:
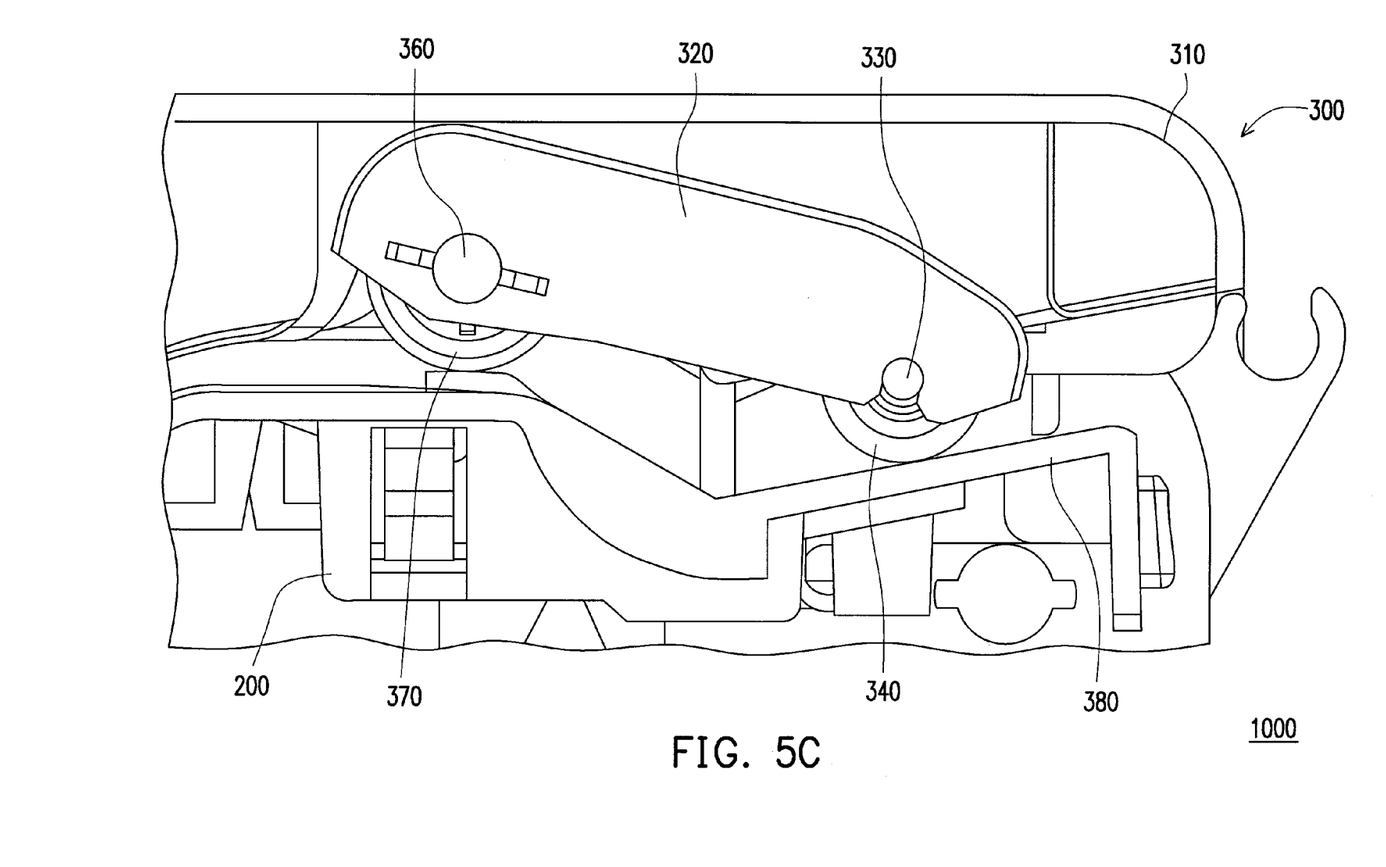
Figure 5D:
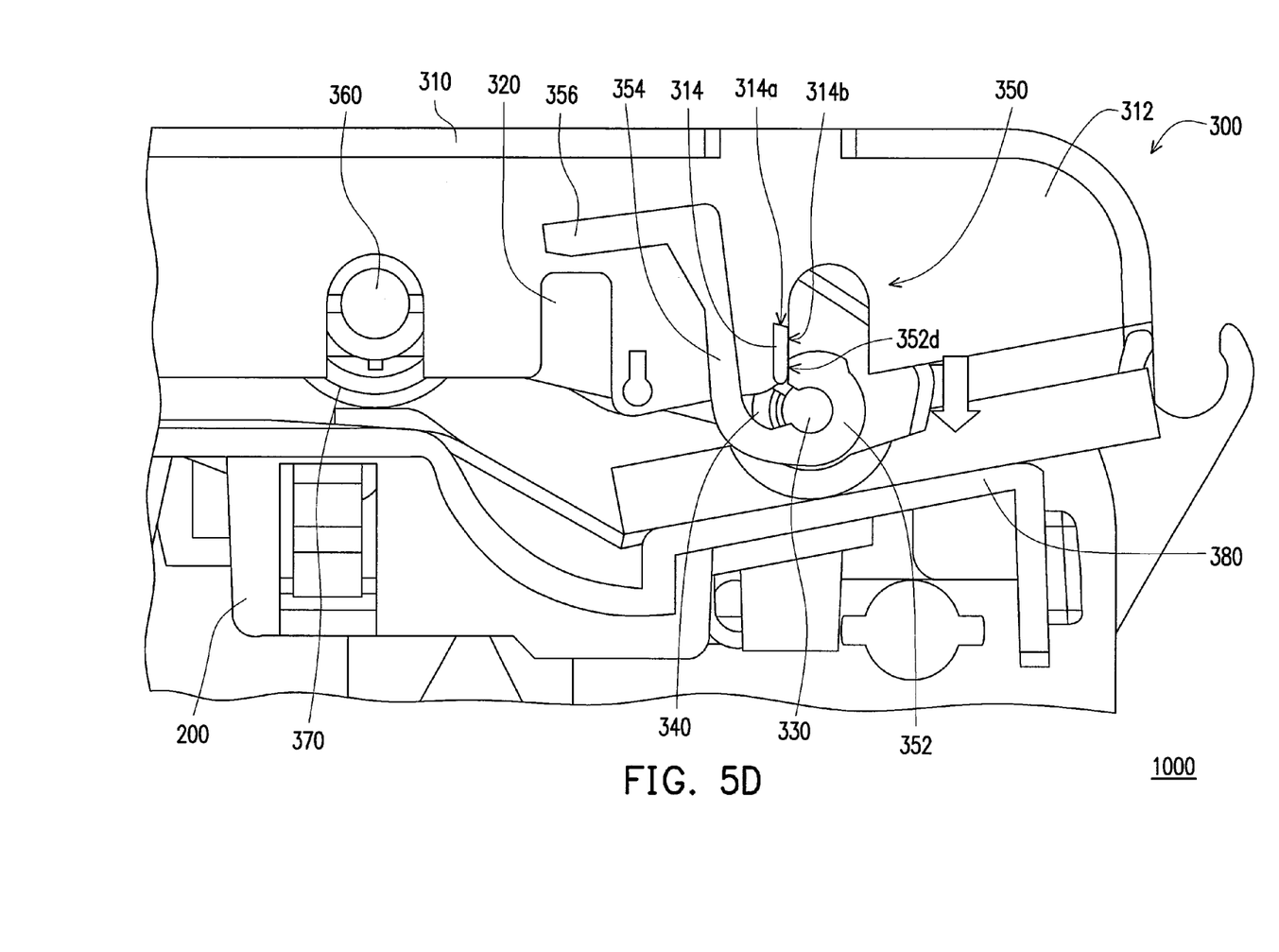

FIG. 5C and FIG. 5D are schematic views respectively illustrating the multi-function printer depicted in FIG. 5A and FIG. 5B in the status of paper feeding. Please refer to FIG. 5A and FIG. 5C together first, when the multi-function printer 1000 is used to copy or print, the inner case 320 of the paper feeding device 300 takes the second axel 360 as a rotating center, a side of the inner case 320 pivoted with the first axel 330 rotates in a clockwise direction toward the tray 380 to approach the tray 380, and the final purpose is to let the first roller 340 to touch the paper carried by the tray 380, and after that the first roller 340 can rotate and take the paper to be transmitted toward the second roller 370 via its own rotation.

And then, please refer to FIG. 5B and FIG. 5D, at the same time, the stopper 350 moves relatively to the outer case 310 along with the movement of the first axel 330 pivoted to a side of the inner case 320. Thus, the first end 352a of the C-ring 352 of the stopper 350 is propped against by the corresponding limiting protrusion 314, and the stopper 350 rotates in a clockwise direction from a stopping position to a paper feeding position by taking the first axel 330 as a rotating center.

More specifically, for example, the C-ring 352 of the stopper 350 takes the first axel 330 as the rotating center and rotates nearly 90 degrees, and as well as the connecting portion 354 rotates from the original nearly horizontal status as shown in FIG. 5B to reach the almost vertical status as shown in FIG. 5D; and as well as the stopping portion 356 propped against the tray 380 to stop papers rotates along with the rotation of the C-ring 352 from the original nearly vertical status as shown in FIG. 5B to reach the almost horizontal status as shown in FIG. 5D, and thus the paper is no longer restricted by the stopping portion 356 and can freely pass through by the driving of the first roller 340 to perform paper feeding.

In order to ensure that the motion of the limiting protrusion 314 propping against the stopper 350 can be smooth and influent, the first end 352a of the stopper 350 further has a first guiding surface 352d, and each limiting protrusion 314 has a second guiding surface 314a, wherein both the first guiding surface 352d and the second guiding surface 314a are inclined surfaces, and the first guiding surface 352d and the second guiding surface 314a prop against each other.

Additionally, each limiting protrusion 314 has a side surface 314b, and during the paper feeding process the first ends 352a of the C-rings 352 of the stoppers 350 correspondingly prop against the side surfaces 314b, and the stoppers 350 are restricted by the limiting protrusions 314 and fixed at the paper feeding position.

When the paper feeding process is completed, reversed to the above mentioned sequence, first the inner case 320 takes the second axel 360 as a rotating center, then a side of the inner case 320 pivoted with the first axel 330 moves along a counter clockwise direction and returns to an original position, and then the relative movement of the first axel 330 and the outer case 310 releases the restriction of the stopper 350 and the corresponding limiting protrusion 314, the stoppers 350 rotates along a counter clockwise direction from the paper feeding position to the stopping position by taking the first axel 330 as a rotating center. It should be noted that, after the limiting protrusion 314 releases the restriction of the stopper 350, the stopping portion 356 freely falls down due to the dead weight of the stopper 350, and drives the first end 352a of the C-ring 352 to rotate along the profile of the corresponding limiting protrusion 314 by taking the first axel 330 as the rotating center, then the stopper 350 rotates in a counter clockwise direction from the paper feeding position to the stopping position, and then the stopper 350 stops the papers carried in the tray 380. Moreover, the interference between the limiting protrusion 314 and the stopper 350 during being back to the original position (the first guiding surface 352d and the second guiding surface 314a prop against each other) may ensure that the stopper 350 may actually be back to its original position, and the problem of the invalid of the functions of the paper feeding device due to the conventional stopper failing to return to its original position can further be prevented.

Compared to the prior art, the stopper 350 of the present embodiment is formed by integrating the two stoppers of the prior art together, and thus when the stopper 350 is applied to the paper feeding device 300, less components are used and the assembling process can be reduced for the operators, and the number of components and parts, the assembling labor time and labor procedure can further be saved.

In addition, the second stopper 120 in the prior art (as shown in FIG. 1) may freely falls, though the first stopper 110 (as shown in FIG. 1) does not restrict the second stopper 120 and the paper can move the second stopper 120 and pass through by the transmitting force, but the second stopper 120 still can interfere with the paper when the paper passes through, and thus the paper may probably be damaged. On the contrary, when the paper feeding device 300 of the multi-function printer 1000 of the present embodiment performs the paper feeding process, the limiting protrusion 314 disposed at the outer case 310 may completely restrict the stopper 350 at the paper feeding position, and the stopping portion 356 of the stopper 350 may be entirely out of the transmitting path of the paper. Therefore, during the paper feeding process, the stopper 350 may absolutely not interfere with the paper, and the completeness of the paper can be maintained and the printing quality can further be increased.

Second Embodiment

Figure 6:
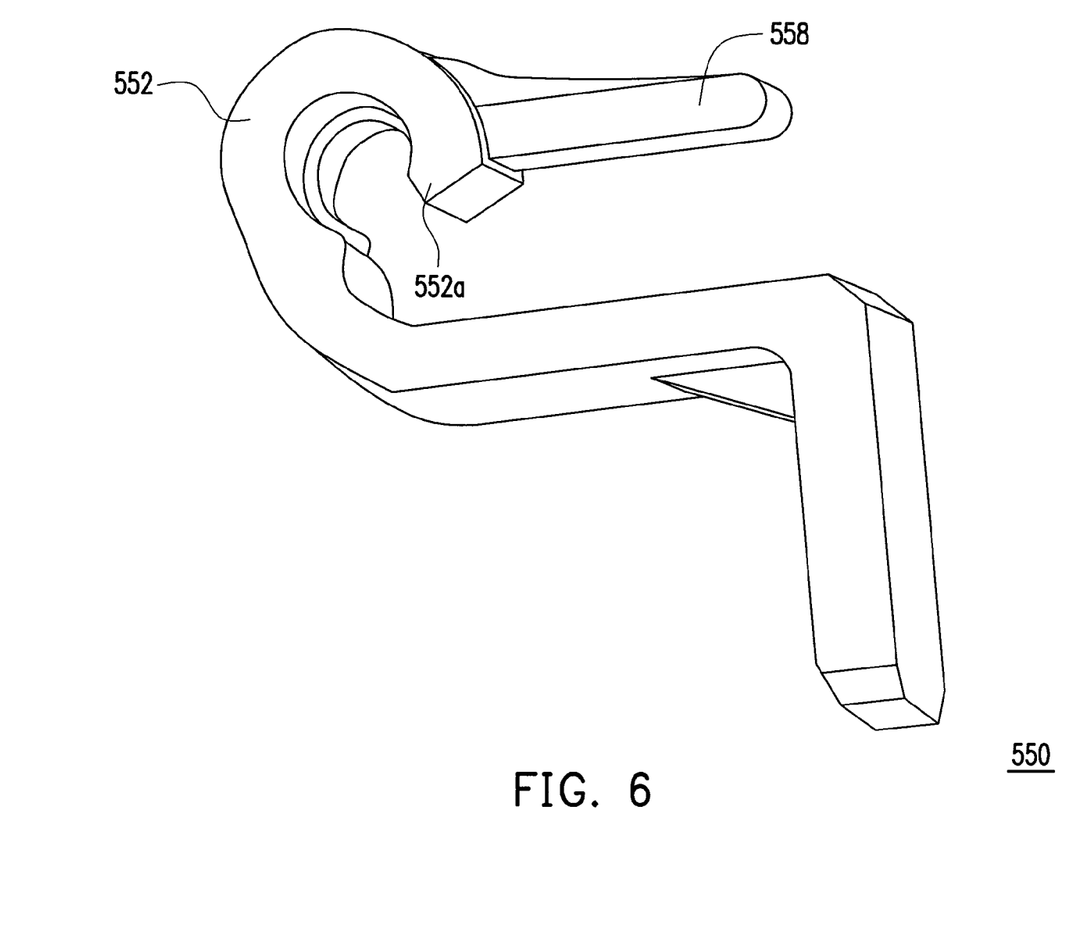
FIG. 6 is a schematic view of a stopper according to a second embodiment of the present invention.

FIG. 6 is a schematic view of a stopper according to a second embodiment of the present invention. Please refer to FIG. 6, the difference between the present embodiment and the previous embodiment is that: the stopper 550 further has a limiting portion 558 connected to the first end 552a of the C-ring 552, and the limiting portion 558 extends along a radial direction of the C-ring 552.

Figure 7A:
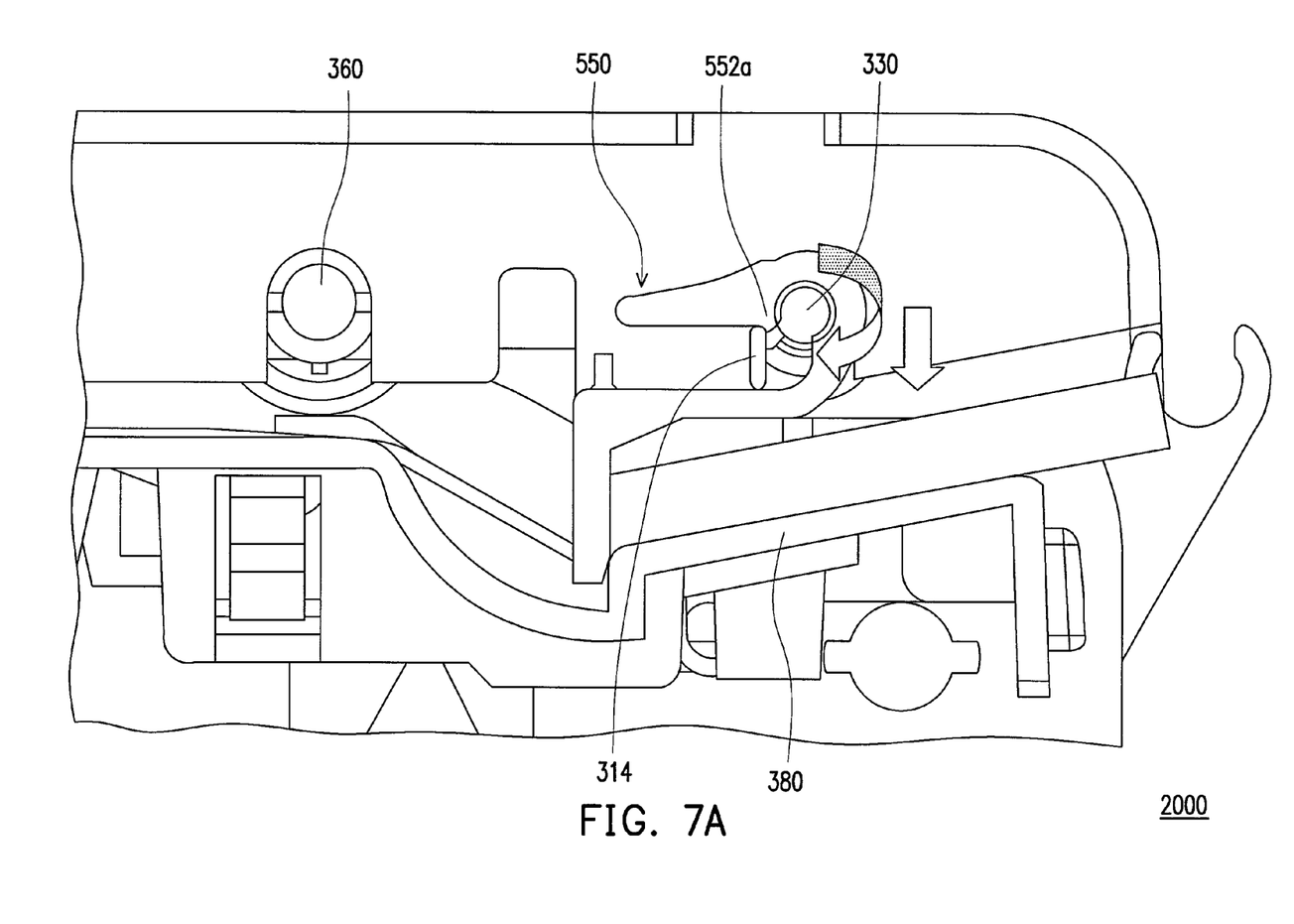
FIG. 7A to FIG. 7C are schematic views showing the process flow of a multi-function printer having the stopper and performing paper feeding process according to an embodiment of the present invention.
Figure 7B:
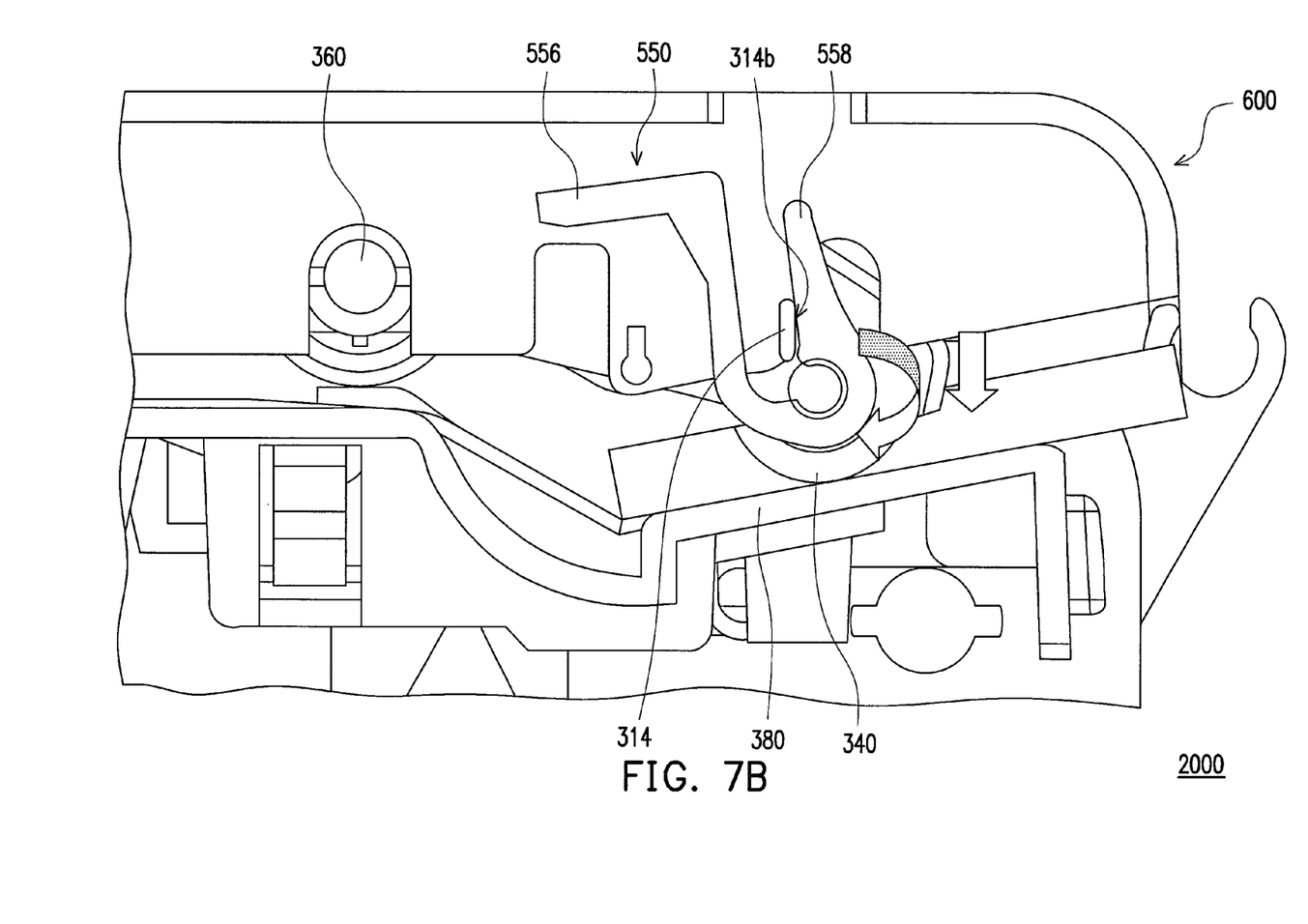
Figure 7C:
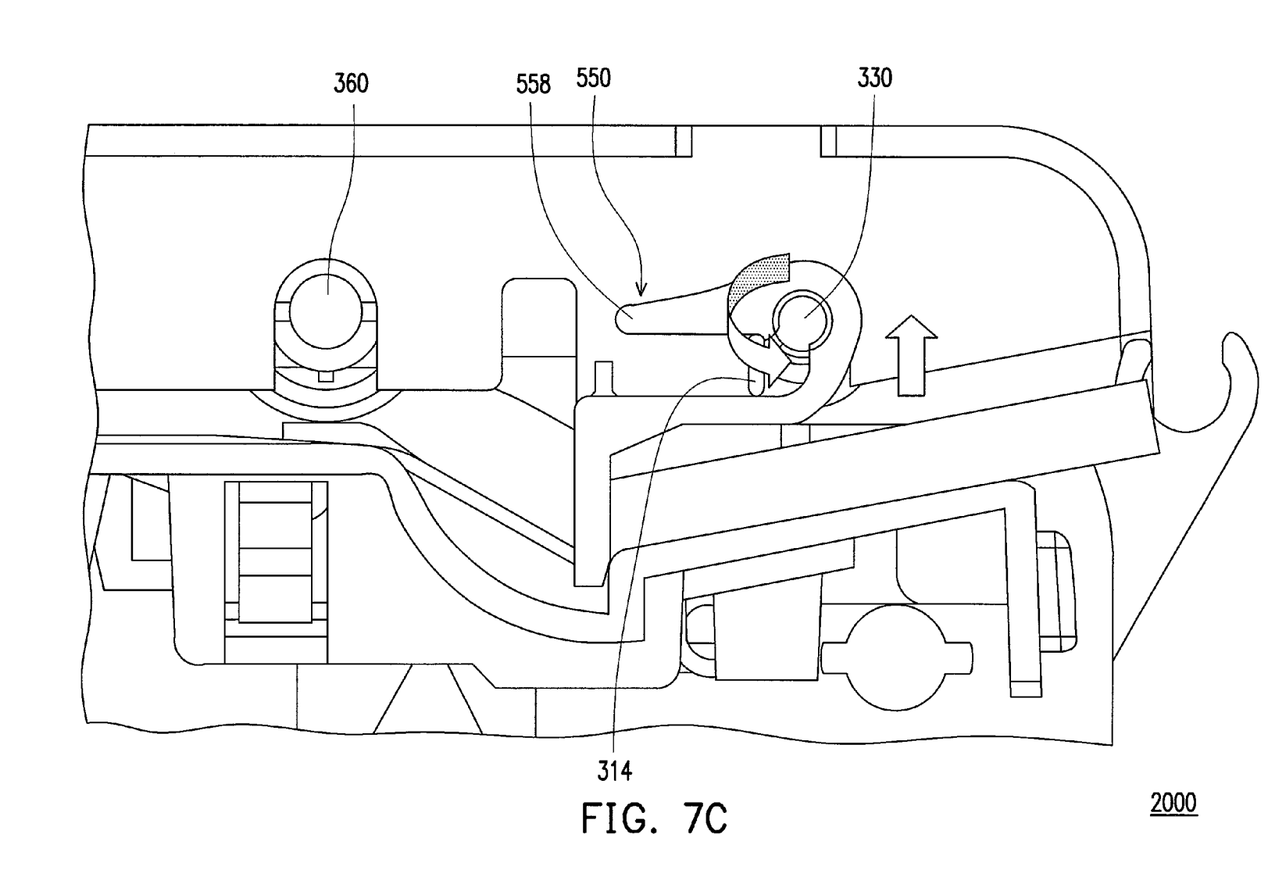

FIG. 7A to FIG. 7C are schematic views showing the process flow of a multi-function printer having the stopper and performing paper feeding process according to an embodiment of the present invention. Please refer to FIG. 7A and FIG. 7B, when the multi-function printer 2000 performs printing or copying process, a side of the inner case 320 (as shown in FIG. 5A) pivoted with the first axel 330 moves along a clockwise direction toward the tray 380 by taking the second axel 360 as a rotating center, the first end 552a of each stopper 550 is propped against by the corresponding limiting protrusion 314, and then the stoppers 550 rotates along a clockwise direction from a stopping position to a paper feeding position by taking the first axel 330 as a rotating center. The stopping portion 556 of stopper 550 located at the paper feeding position relatively moves away from the paper transmitting path, and the first roller 340 rotates and takes the paper for transmission.

In this time, the side surface 314b of the limiting protrusion 314 correspondingly props against the limiting portion 558 of the stopper 550, and the stoppers 550 are restricted by the limiting protrusions 314 and fixed at the paper feeding position. Thus, during the paper feeding process, the limiting portion 558 of the stopper 550 will not touch the paper transmitted.

And then, please refer to FIG. 7B and FIG. 7C, after the paper feeding process is completed, similarly, a side of the inner case 320 (shown in FIG. 5) pivoted with the first axel 330 moves along a counter clockwise direction to return to an original position by taking the second axel 360 as a rotating center, and each stopper 550 and the corresponding limiting protrusion 314 release the restriction, the stoppers 550 rotates along a counter clockwise direction from the paper feeding position to the stopping position by taking the first axel 330 as a rotating center.

Similarly, via dead weights of the stoppers 550, the stoppers 550 rotate along with the first axel 330, and the limiting portions 558 takes the first axel 330 as a rotating center to rotate along the profiles of the corresponding limiting protrusions 314 in a counter clockwise direction from the paper feeding position to the stopping position.

In order to ensure that the motion of the limiting protrusion 314 propping against the stopper 550 can be smooth and influent, similarly, guiding surfaces can be disposed at the places where the stoppers 550 and the limiting protrusions 314 may prop against each other. The configuration of guiding surfaces has been described in the first embodiment, and it is not repeated herein.

In light of the foregoing, the stopper of the present invention is a single structure, unlike the prior art using two stoppers, and has the advantages of using less components and reducing manufacturing costs. When the stopper of the present invention is applied to the paper feeding device, since the stopper is formed by integrating the two stoppers of the prior art into a one piece, less components are used and the assembling process can be reduced for the operators, and the number of components and parts, the assembling labor time and labor procedure can further be saved.

Furthermore, when the paper feeding device of the multi-function printer of the present invention performs the paper feeding process, the limiting protrusion disposed at the outer case may completely restrict the stopper at the paper feeding position, and thus the stopping portion of the stopper may be entirely out of the transmitting path of the paper. Therefore, during the paper feeding process, the stopper may absolutely not interfere with the paper, and the completeness of the paper can be maintained and the printing quality can further be increased.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A stopper, adapted to a paper feeding device, having a C-ring, a connecting portion and a stopping portion, the C-ring disposed around and covering an axel of the paper feeding device, the C-ring having a first end and a second end, the second end extending along a tangent direction, connected to a third end of the connecting portion and having a protrusion protruding toward the first end, the stopping portion connected to a fourth end of the connecting portion, and an included angle formed between the stopping portion and the connecting portion.

2. The stopper as claimed in claim 1, wherein a material of the stopper is plastic.

3. The stopper as claimed in claim 1, wherein the included angle is an acute angle, a right angle or an obtuse angle.

4. The stopper as claimed in claim 1, wherein the first end further has a guiding surface, and the guiding surface faces the connecting portion.

5. The stopper as claimed in claim 1, further having a limiting portion, wherein the limiting portion is connected to the first end of the C-ring and extending along a radial direction of the C-ring.

6. A paper feeding device, comprising:
an outer case, having a pair of side walls and a pair of limiting protrusions, wherein each limiting protrusion is correspondingly disposed at one of the pair of side walls;
an inner case, located between the pair of side walls of the outer case, and each side wall is located between the inner case and the corresponding limiting protrusion;
a first axel, pivoted between the inner case and the pair of side walls;
a first roller, disposed around and covering the first axel and located in the inner case;
a pair of stoppers, disposed at outer sides of the pair of side walls which are relatively distant from the inner case, wherein each stopper has a C-ring, a connecting portion and a stopping portion, the C-ring is disposed around and covers the first axel, the C-ring has a first end and a second end, the limiting protrusion props against the first end, the second end extends along a tangent direction and is connected to a third end of the connecting portion, the stopping portion is connected to a fourth end of the connecting portion, and an included angle is formed between the stopping portion and the connecting portion;

a second axel, pivoted at the inner case, and located at a side of the inner case opposite to the first axel;

a second roller, disposed around and covering the second axel, and located in the inner case; and a tray, disposed below the first roller and located in the inner case.

7. The paper feeding device as claimed in claim 6, wherein a material of the stoppers is plastic.

8. The paper feeding device as claimed in claim 6, wherein the included angle formed between the stopper and the connecting portion is an acute angle, a right angle or an obtuse angle.

9. The paper feeding device as claimed in claim 6, wherein the first end of each stopper further has a first guiding surface, and each limiting protrusion further has a second guiding surface, and the first guiding surface and the second guiding surface prop against each other.

10. The paper feeding device as claimed in claim 6, wherein the second end of each stopper further has a protrusion, and the protrusion protrudes toward the first end.

11. The paper feeding device as claimed in claim 6, wherein each stopper further has a limiting portion, the limiting portion is connected to the first end of the C-ring and extending along a radial direction of the C-ring.

12. The paper feeding device as claimed in claim 11, wherein a side of the inner case pivoted with the first axel moves along a clockwise direction toward the tray by taking the second axel as a rotating center, the first end of each stopper is propped against by the corresponding limiting protrusion, the stoppers rotates along a clockwise direction from a stopping position to a paper feeding position by taking the first axel as a rotating center.

13. The paper feeding device as claimed in claim 12, wherein each limiting protrusion has a side surface, and the limiting portions of the stoppers correspondingly prop against the side surfaces, and the stoppers are restricted by the limiting protrusions and fixed at the paper feeding position.

14. The paper feeding device as claimed in claim 13, wherein a side of the inner case pivoted with the first axel moves along a counter clockwise direction to return to an original position by taking the second axel as a rotating center, the first end of each stopper and the corresponding limiting protrusion release the restriction, the stoppers rotates along a counter clockwise direction from the paper feeding position to the stopping position by taking the first axel as a rotating center.

15. The paper feeding device as claimed in claim 14, wherein via dead weights of the stoppers, the stoppers rotate along with the first axel, and the limiting portions taking the first axel as a rotating center rotate along profiles of the corresponding limiting protrusions in a counter clockwise direction from the paper feeding position to the stopping position.

16. The paper feeding device as claimed in claim 6, wherein a side of the inner case pivoted with the first axel moves along a clockwise direction toward the tray by taking the second axel as a rotating center, the first end of each stopper is propped against by the corresponding limiting protrusion, the stoppers rotates along a clockwise direction from a stopping position to a paper feeding position by taking the first axel as a rotating center.

17. The paper feeding device as claimed in claim 16, wherein each limiting protrusion has a side surface, and the first ends of the C-rings of the stoppers prop against the side surfaces, and the stoppers are restricted by the limiting protrusions and fixed at the paper feeding position.

18. The paper feeding device as claimed in claim 17, wherein a side of the inner case pivoted with the first axel moves along a counter clockwise direction to return to an original position by taking the second axel as a rotating center, the first end of each stopper and the corresponding limiting protrusion release the restriction, the stoppers rotates along a counter clockwise direction from the paper feeding position to the stopping position by taking the first axel as a rotating center.

19. The paper feeding device as claimed in claim 18, wherein via dead weights of the stoppers, the stoppers rotate along with the first axel, and the first ends of the C-rings taking the first axel as a rotating center rotate along profiles of the corresponding limiting protrusions in a counter clockwise direction from the paper feeding position to the stopping position.

20. A multi-function printer, comprising:

a body;

a paper feeding device, disposed at the body and comprising:

an outer case, covering the body, having a pair of side walls and a pair of limiting protrusions, wherein each limiting protrusion is correspondingly disposed at one of the pair of side walls;

an inner case, located between the pair of side walls of the outer case, and each side wall is located between the inner case and the corresponding limiting protrusion;

a first axel, pivoted between the inner case and the pair of side walls;

a first roller, disposed around and covering the first axel and located in the inner case;

a pair of stoppers, disposed at outer sides of the pair of side walls which are relatively distant from the inner case, wherein each stopper has a C-ring, a connecting portion and a stopping portion, the C-ring is disposed around and covers the first axel, the C-ring has a first end and a second end, the limiting protrusion props against the first end, the second end extends along a tangent direction and is connected to a third end of the connecting portion, the stopping portion is connected to a fourth end of the connecting portion, and an included angle is formed between the stopping portion and the connecting portion;

a second axel, pivoted at the inner case, and located at a side of the inner case opposite to the first axel;

a second roller, disposed around and covering the second axel, and located in the inner case; and a tray, disposed below the first roller and located in the inner case.

21. The multi-function printer as claimed in claim 20, wherein a material of the stoppers is plastic.

22. The multi-function printer as claimed in claim 20, wherein the included angle formed between the stopper and the connecting portion is an acute angle, a right angle or an obtuse angle.

23. The multi-function printer as claimed in claim 20, wherein the first end of each stopper further has a first guiding surface, and each limiting protrusion further has a second guiding surface, and the first guiding surface and the second guiding surface prop against each other.

24. The multi-function printer as claimed in claim 20, wherein the second end of each stopper further has a protrusion, and the protrusion protrudes toward the first end.

25. The multi-function printer as claimed in claim 20, wherein each stopper further has a limiting portion, the limiting portion is connected to the first end of the C-ring and extending along a radial direction of the C-ring.

26. The multi-function printer as claimed in claim 25, wherein a side of the inner case pivoted with the first axel moves along a clockwise direction toward the tray by taking the second axel as a rotating center, the first end of each stopper is propped against by the corresponding limiting protrusion, the stoppers rotates along a clockwise direction from a stopping position to a paper feeding position by taking the first axel as a rotating center.

27. The multi-function printer as claimed in claim 26, wherein each limiting protrusion has a side surface, and the limiting portions of the stoppers correspondingly prop against the side surfaces, and the stoppers are restricted by the limiting protrusions and fixed at the paper feeding position.

28. The multi-function printer as claimed in claim 27, wherein a side of the inner case pivoted with the first axel moves along a counter clockwise direction to return to an original position by taking the second axel as a rotating center, the first end of each stopper and the corresponding limiting protrusion release the restriction, the stoppers rotates along a counter clockwise direction from the paper feeding position to the stopping position by taking the first axel as a rotating center.

29. The multi-function printer as claimed in claim 28, wherein via dead weights of the stoppers, the stoppers rotate along with the first axel, and the limiting portions taking the first axel as a rotating center rotate along profiles of the corresponding limiting protrusions in a counter clockwise direction from the paper feeding position to the stopping position.

30. The multi-function printer as claimed in claim 20, wherein a side of the inner case pivoted with the first axel moves along a clockwise direction toward the tray by taking the second axel as a rotating center, the first end of each stopper is propped against by the corresponding limiting protrusion, the stoppers rotates along a clockwise direction from a stopping position to a paper feeding position by taking the first axel as a rotating center.

31. The multi-function printer as claimed in claim 30, wherein each limiting protrusion has a side surface, and the first ends of the C-rings of the stoppers prop against the side surfaces, and the stoppers are restricted by the limiting protrusions and fixed at the paper feeding position.

32. The multi-function printer as claimed in claim 31, wherein a side of the inner case pivoted with the first axel moves along a counter clockwise direction to return to an original position by taking the second axel as a rotating center, the first end of each stopper and the corresponding limiting protrusion release the restriction, the stoppers rotate along a counter clockwise direction from the paper feeding position to the stopping position by taking the first axel as a rotating center.

33. The multi-function printer as claimed in claim 32, wherein via dead weights of the stoppers, the stoppers rotate along with the first axel, and the first ends of the C-rings taking the first axel as a rotating center rotate along profiles of the corresponding limiting protrusions in a counter clockwise direction from the paper feeding position to the stopping position.

* * * * *